S. C. LAWSON.
WELL DRILL FEEDING MECHANISM.
APPLICATION FILED DEC. 26, 1912.

1,098,273.

Patented May 26, 1914.
3 SHEETS—SHEET 2.

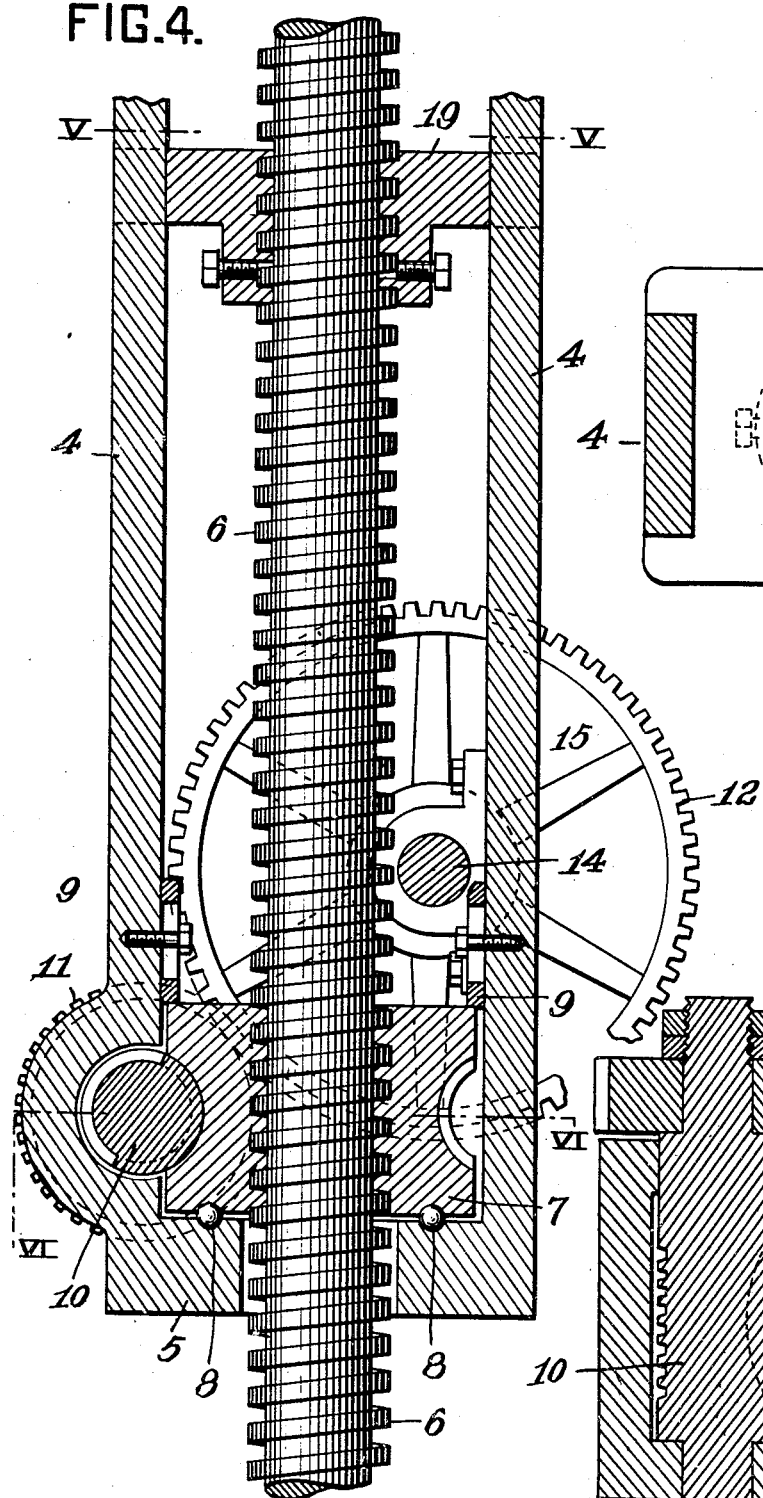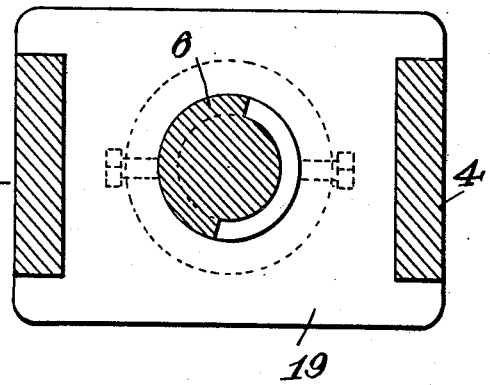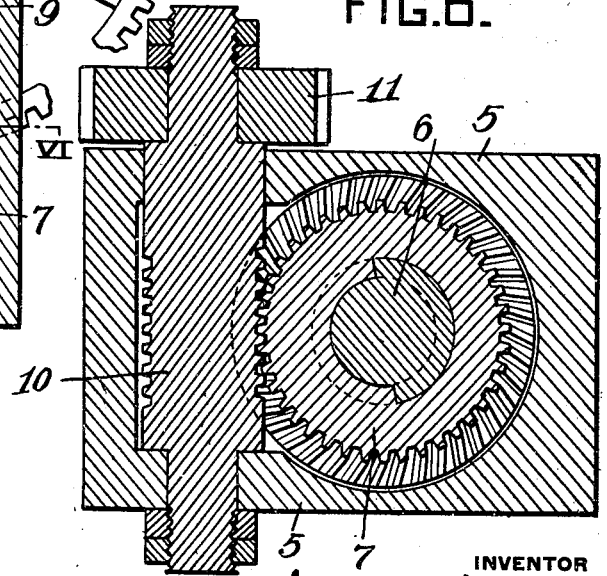

UNITED STATES PATENT OFFICE.

SAMUEL C. LAWSON, OF TULSA, OKLAHOMA, ASSIGNOR OF ONE-THIRD TO PAUL ARBON AND ONE-THIRD TO JOHN EDWIN PROSSER, BOTH OF TULSA, OKLAHOMA.

WELL-DRILL-FEEDING MECHANISM.

1,098,273.  Specification of Letters Patent.  Patented May 26, 1914.

Application filed December 26, 1912. Serial No. 738,666.

*To all whom it may concern:*

Be it known that I, SAMUEL C. LAWSON, residing at Tulsa, in the county of Tulsa and State of Oklahoma, a citizen of the United States, have invented or discovered certain new and useful Improvements in Well-Drill-Feeding Mechanism, of which improvements the following is a specification.

In drilling oil wells, the rope carrying the drilling tools is after the latter have been lowered into the well, secured between clamping jaws which in turn are connected to the walking beam by suitable connections where the rope and drill are lowered as the drilling progresses. The feed device now employed consists of a hanger attached at one end to the walking beam and carrying a nut through which passes a threaded rod several feet in length and connected at its lower end to the clamps engaging the rope. For reasons which are immaterial to the matter under consideration the "temper" screw mechanism has been so constructed as to require the threaded rod to be rotated, and hence at the beginning of the feeding operation, the handle whereby the rod was rotated was at such a height above the platform of the derrick that the operator was compelled to use a step ladder in order to operate the screw. As the drilling progressed the operator would move down. And further, it is always a matter of considerable difficulty to lock the screw after each feed to prevent its movement by the jarring and jerking incident to the reciprocation of the drill.

The invention described herein has for its object a construction whereby the feeding may be effected from the platform of the derrick regardless of the length of temper screw employed.

It is a further object of the invention to so construct the feed mechanism that no feed movement will be caused by the jars or jerks to which the feed mechanism is subjected.

The invention is hereinafter more fully described and claimed.

Figure 1:
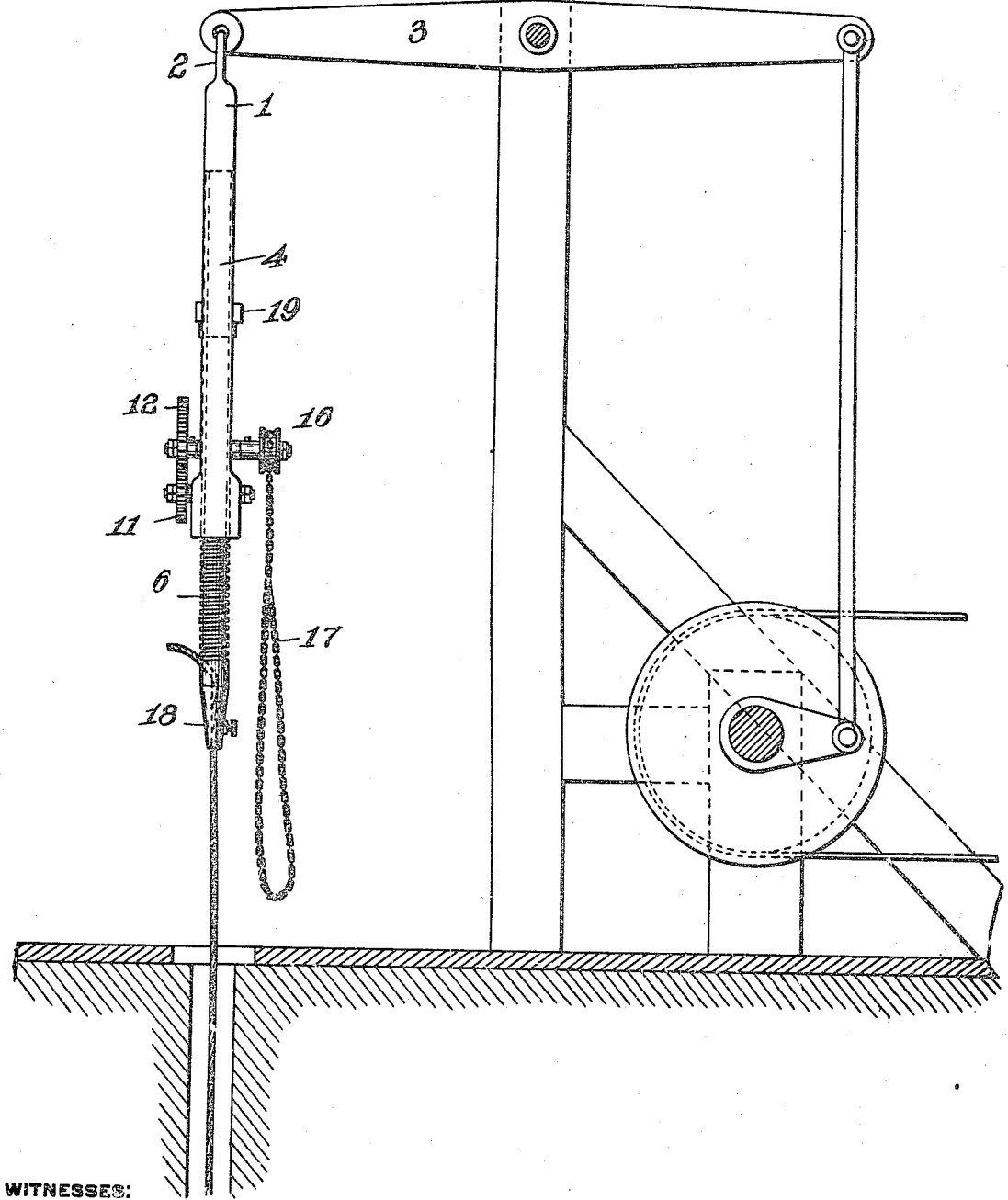
Figure 2:
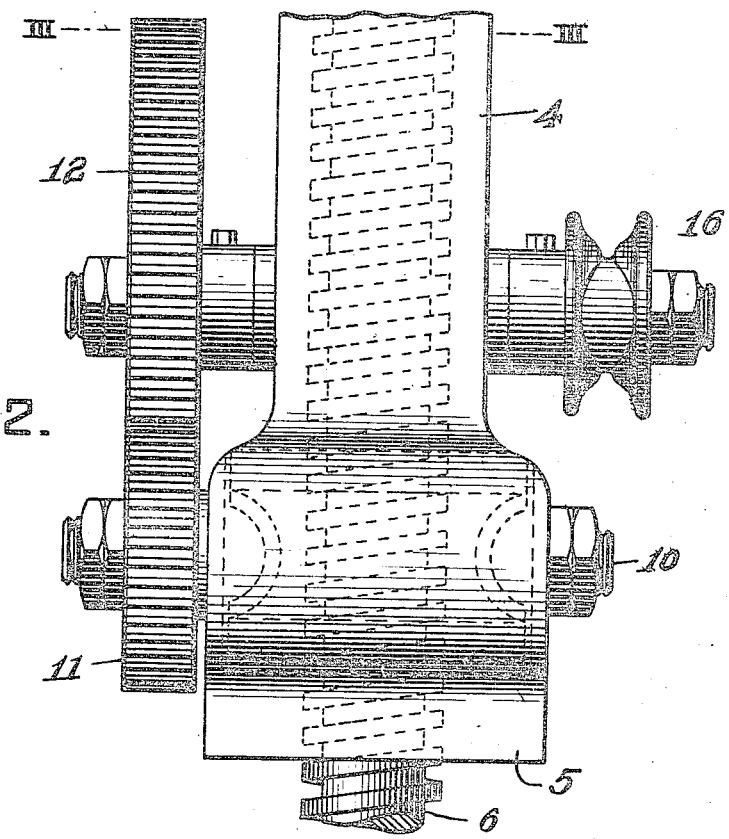
Figure 3:
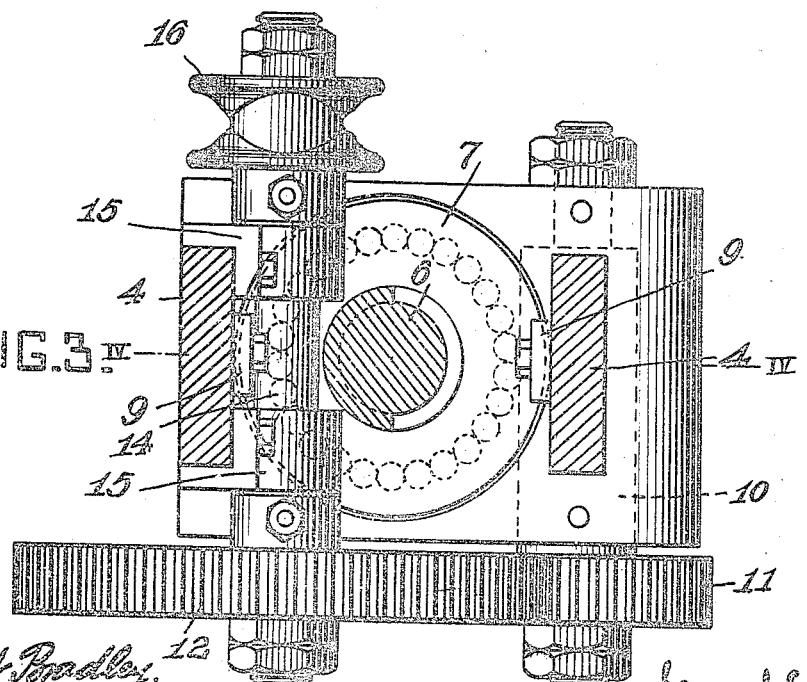

In the accompanying drawings forming a part of this specification, Figure 1 is an elevation of a portion of a drilling apparatus including my improved feed mechanism; Fig. 2 is a side elevation on an enlarged scale of the lower portion of the feed mechanism; Fig. 3 is a sectional plan view on a plane indicated by the line III—III, Fig. 2; Fig. 4 is a sectional elevation on a plane indicated by the line IV—IV Fig. 3; Figs. 5 and 6 are transverse sections on planes indicated respectively by the lines V—V and VI—VI Fig. 4.

In the practice of my invention the hanger consists of a head portion 1 provided with a hook 2 or other suitable means whereby it may be attached to the walking beam 3 or other suitable drill operating means. The guide reins or side bars 4 have their upper ends secured to or formed integral with the head 1 and carry at their lower ends the nut supporting base 5, through which is formed an opening for the passage of the feed or temper screw 6. In the base is formed a circular recess for the reception of the nut 7, between which and the bottom of the socket anti-friction balls 8 are preferably arranged as shown in Figs. 3 and 4. The nut is held against vertical movement in the hanger by removable stops 9 secured to the side bars or reins 4. The periphery of the nut is grooved and the walls of the groove are suitably toothed to intermesh with the worm on the shaft 10 which is mounted in bearings formed by the ends of a lateral swell or enlargement of the hanger adjacent to its lower end. A pinion 11 is secured on the projecting end of the shaft and intermeshes with a gear wheel 12 on the shaft 14 which is mounted in bearings 15 preferably detachably secured to one of the reins 4 above the nut socket. On the shaft 14 is also secured a sprocket wheel 16 which is operated by an endless chain 17 made of such a length that the lower loop is readily accessible from the floor of the derrick.

While not essential it is preferred that the gear wheel 12 should be made considerably larger than the pinion 11, so that the screw 6 may be quickly run back for a new feed.

As shown in Fig. 1 a clamp 18 is connected to the lower end of the screw 6. It is preferred to provide means for holding the upper portion of the screw from lateral movement relative to the hanger. This function as well as preventing a rotation of the screw with the nut can be conveniently accomplished by a guide head 19 adapted to slip onto the screw and so secured to the latter as by set screws to move longitudinally therewith. At its opposite ends, the head is notched for the reception of the reins or side bars 4.

When the nut is rotated to effect the longitudinal movement of the screw, the position of the feed mechanism relative to the platform of the derrick is at all times practically the same, the only variation being due to the reciprocation of the walking beam. By reason of the worm and screw engagement with the rotating member, the other member being held against rotation at all times, there will not be any unintentional feed movement of the screw.

I claim herein as my invention:

1. In a well drill feeding mechanism, the combination of a hanger, a nut carried by the hanger, a screw engaging the nut and adapted to be attached to the drill rope, a guide head movable along the hanger and adapted to engage the screw to prevent the rotation of the latter and maintain it in parallelism with the hanger, gearing adapted to rotate the nut to effect the longitudinal movement of the screw, and lock the nut as against accidental movement.

2. In a well drill feeding device, the combination of a hanger, a nut having a toothed periphery supported by the hanger, a screw engaging the nut and adapted to be attached to the drill rope, a worm engaging the toothed portion of the nut, a sprocket wheel and chain carried by the hanger, gearing interposed between the sprocket wheel and worm, and means for preventing the rotation of the screw.

3. In a well drill feeding device, the combination of a hanger, a nut having a toothed periphery supported by the hanger, a screw engaging the nut and adapted to be attached to the drill rope, a worm engaging the toothed portion of the nut, a sprocket wheel and chain carried by the hanger, gearing interposed between the sprocket wheel and worm, and a movable guide head attached to the screw and engaging portions of the hanger.

In testimony whereof, I have hereunto set my hand.

SAMUEL C. LAWSON.

Witnesses:
 PAUL ARBON,
 WM. L. ALEXANDER.